United States Patent
Rucks et al.

(10) Patent No.: US 6,186,671 B1
(45) Date of Patent: Feb. 13, 2001

(54) OPTICAL FIBER FERRULE

(75) Inventors: Michael Rucks, Schwerte; Paul Gerhard Halbach, Wuppertal, both of (DE)

(73) Assignee: Delphi Technologies, Inc., Troy, MI (US)

( * ) Notice: Under 35 U.S.C. 154(b), the term of this patent shall be extended for 0 days.

(21) Appl. No.: 09/371,629

(22) Filed: Aug. 11, 1999

(30) Foreign Application Priority Data

Sep. 11, 1998 (DE) ................................. 198 41 766

(51) Int. Cl.⁷ ....................................... G02B 6/36
(52) U.S. Cl. ................ 385/81; 385/72; 385/77; 385/78; 385/87
(58) Field of Search .................. 385/76, 77, 78, 385/81, 60, 87, 72

(56) References Cited

U.S. PATENT DOCUMENTS

| | | | |
|---|---|---|---|
| 3,789,485 | 2/1974 | Gudmestad | 29/203 D |
| 4,815,808 | 3/1989 | Honma et al. | 350/96.2 |
| 5,231,685 | 7/1993 | Hanzawa et al. | 385/84 |

FOREIGN PATENT DOCUMENTS

| | | |
|---|---|---|
| 26 16 876 | 10/1977 | (DE) . |
| 0636380 A1 | 2/1995 | (EP) . |
| 2154648 | 9/1985 | (GB) . |
| 58181006 | 10/1983 | (JP) . |

*Primary Examiner*—Hemang Sanghavi
*Assistant Examiner*—Sung Pak
(74) *Attorney, Agent, or Firm*—Richard A. Jones

(57) ABSTRACT

A ferrule (10) for attachment to the end of an optical fiber (28) comprising a tubular body (12) having a front face (14) and a rear face (16); a ring member (18) positioned adjacent the front face and having an internal diameter which allows a close sliding fit on the body; and a breakable membrane (20) connecting the ring member to the body; wherein the tubular body has an axially extending through bore (22) having a front portion (24) opening through the front face and being sized to receive an optical fiber in a close fit, and a rear portion (26) opening through the rear face and being sized to receive a sheath or jacket (30) of the optical fiber in a close fit; wherein the tubular body has two or more axially extending slots (32) which open into the rear portion of the bore and open through the rear face, and which define resilient arms (34) therebetween for gripping the sheath; and wherein the ferrule is moulded in one piece from plastics material. A one piece arrangement which removes the need for a separation special fixing element.

4 Claims, 2 Drawing Sheets

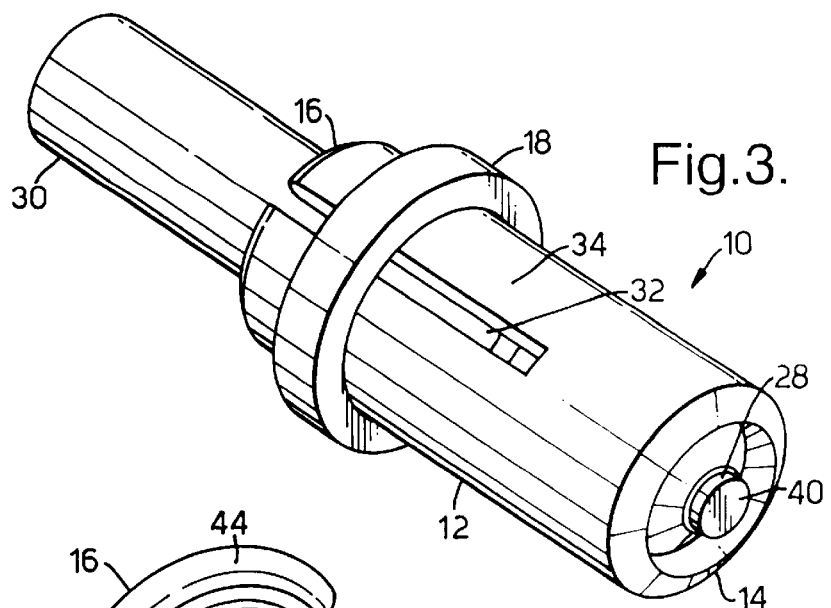
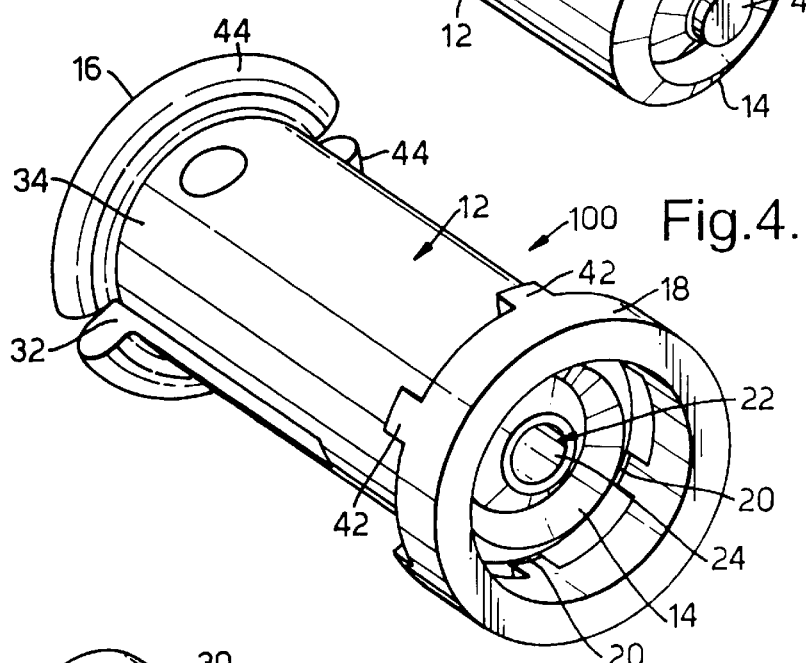
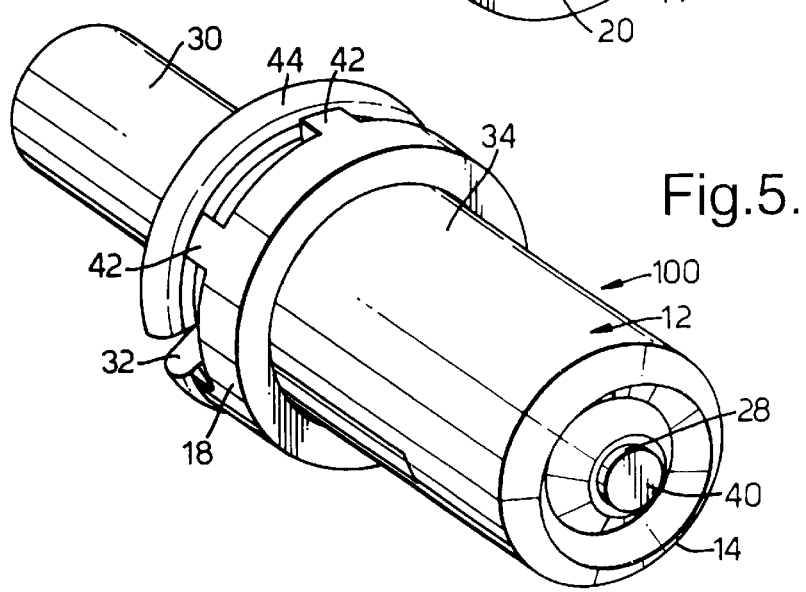

OPTICAL FIBER FERRULE

TECHNICAL FIELD

The present invention relates to a ferrule for securing to the end of an optical fiber.

BACKGROUND OF THE INVENTION

In order to terminate the end of an optical fiber, especially a polymer optical fiber, it is known to place a ferrule on the end of the fiber. The ferrule assists in the correct positioning of the end of the fiber in a connecting system and/or in the correct positioning of the end of the fiber for subsequent end face treatment. Known ferrules require a special fixing element, such as a crimp ring or a stamped metal part, to secure the ferrule to the fiber.

SUMMARY OF THE INVENTION

It is an object of the present invention to provide an improvement to the known arrangements.

A ferrule in accordance with the present invention for attachment to the end of an optical fiber comprises a tubular body having a front face and a rear face; a ring member positioned adjacent the front face and having an internal diameter which allows a close sliding fit on the body; and a breakable membrane connecting the ring member to the body; wherein the tubular body has an axially extending through bore having a front portion opening through the front face and being sized to receive an optical fiber in a close fit, and a rear portion opening through the rear face and being sized to receive a sheath or jacket of the optical fiber in a close fit; wherein the tubular body has two or more axially extending slots which open into the rear portion of the bore and open through the rear face, and which define resilient arms therebetween for gripping the sheath; and wherein the ferrule is moulded in one piece from plastics material.

A one piece arrangement which removes the need for a separate special fixing element.

BRIEF DESCRIPTION OF THE DRAWINGS

The present invention will now be described, by way of example, with reference to the accompanying drawings, in which:

FIG. 3 is a view similar to that of FIG. 1 after insertion and clamping of an end of an optical fiber in the ferrule of FIG. 1;

FIG. 4 is a front perspective view of a second embodiment of ferrule in accordance with the present invention; and FIG. 5 is a view similar to that of FIG. 4 after insertion and clamping of an end of an optical fiber in the ferrule of FIG. 4.

DESCRIPTION OF THE PREFERRED EMBODIMENT

Figure 1:
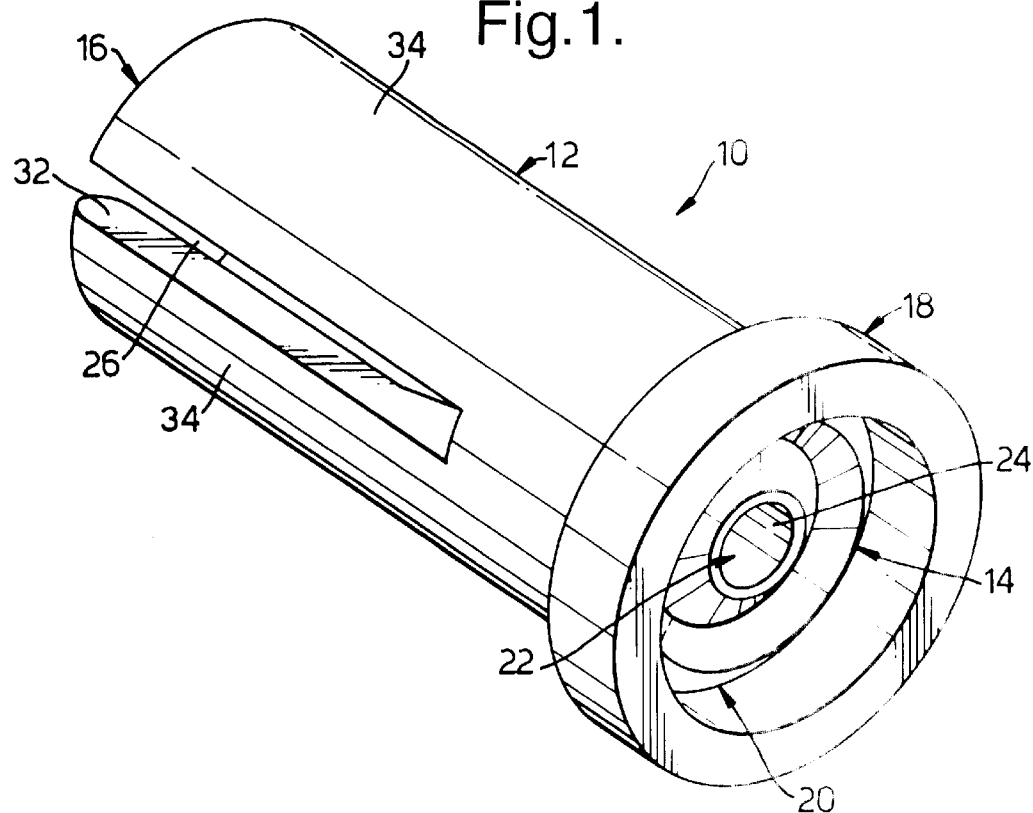
FIG. 1 is a front perspective view of a first embodiment of ferrule in accordance with the present invention.
Figure 2:
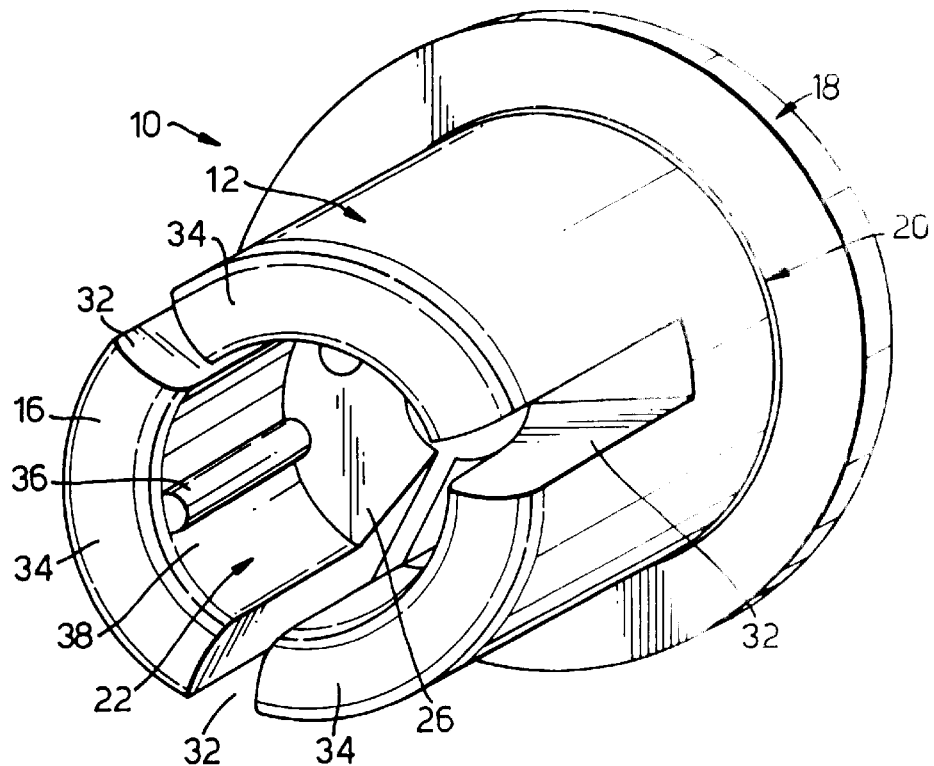
FIG. 2 is a rear perspective view of the ferrule of FIG. 1.

Referring to FIGS. 1 and 2, the first embodiment of ferrule 10 in accordance with the present invention is moulded in one piece from plastics material. The ferrule 10 comprises a tubular body 12 having a front face 14 and a rear face 16; a ring member 18 adjacent the front face of the body; and a breakable membrane 20 connecting the ring member to the body. The ring member 18 has an internal diameter which is substantially the same as, or slightly greater than, the external diameter of the body 12, such that on breaking of the breakable membrane 20, the ring member can make a close sliding fit along the body towards the rear face 16, for reasons which will be explained below.

The tubular body 12 has an axially extending through bore 22 with a front portion 24 opening through the front face 14, and a rear portion 26 opening through the rear face 16. The front portion 24 has a smaller diameter than the rear portion 26. The front portion 24 is sized to receive an optical fiber 28 (FIG. 3) in a close sliding fit. The rear portion 26 is sized to receive the sheath or jacket 30 which covers the optical fiber 28 in a close sliding fit. The tubular body 12 has two or more axially extending slots 32 which open into the rear portion 26 of the bore 22 and open through the rear face 16, and which define resilient arms 34 therebetween. Each arm 34 preferably has one or more axially extending ribs 36 formed on the inner surface 38 thereof inside the rear portion 26 of the bore 22.

In use, the sheath or jacket 30 is stripped from the end 40 of the optical fiber 28. The ferrule 10 is slid onto the optical fiber 28 with the stripped fiber being positioned in the front portion 24 of the bore 22 and the sheath 30 being positioned in the rear portion 26. The end 40 of the fiber 28 is either aligned with the front face 14 of the tubular body 12 or projects beyond the front face. The insertion of the sheath 30 in the rear portion 26 of the bore 22 pushes the arms 34 in a radially outward direction either due to the diameter of the rear portion relative to the sheath diameter and/or due to the ribs 38. The breakable membrane 20 is then broken and the ring member 18 slid towards the rear face 16 of the body 12 (as shown in FIG. 3) to push the arms radially inwards to clamp the arms onto the sheath 30 of the fiber 28.

Compared to the prior known arrangements, no special separate fixing element is required. The ferrule can be moulded in one piece from plastics material. No metallic elements are required, which reduces the risk of damaging the optical fiber during assembly. Assembly on the optical fiber is easier.

Referring to FIGS. 4 and 5, the second embodiment of ferrule 100 is substantially the same as the first embodiment described above, and like parts have been given the same reference numeral. In the second embodiment, the ring member 18 has a number of rearwardly directed tabs 42, each of which is attached to the tubular body 12 by the breakable membrane 20. Each arm 34 has, at the rear face 16 of the body 12, a radially outwardly extending shoulder 44. In use, the shoulder 44 acts as a stop member to limit rearward movement of the ring member 18 during clamping of the ferrule 100 on the sheath 30 of the optical fiber 28.

What is claimed is:

1. A ferrule (10) for attachment to the end of an optical fiber (28) comprising a tubular body (12) having a front face (14) and a rear face (16); a ring member (18) positioned adjacent the front face and having an internal diameter which allows a close sliding fit on the body; and a breakable membrane (20) connecting the ring member to the body; wherein the tubular body has an axially extending through bore (22) having a front portion (24) opening through the front face receiving an optical fiber in a close fit, and a rear portion (26) opening through the rear face receiving a sheath or jacket (30) of the optical fiber in a close fit; wherein the tubular body has two or more axially extending slots (32) which open into the rear portion of the bore and open through the rear face, and which define resilient arms (34) therebetween for gripping the sheath; and wherein the ferrule is molded in one piece from plastics material.

2. A ferrule as claimed in claim 1, wherein the inner surface (38) of each resilient arm (34) has an axially extending rib (36) for gripping the sheath (30) of the optical fiber (28).

3. A ferrule as claimed in claim 1 or claim 2, wherein the ring member (18) has a number of rearwardly directed tabs (42) each of which is attached to the tubular body (12) by the breakable membrane (20).

4. A ferrule as claimed in claim 3, wherein each resilient arm (34) has a radially outwardly extending shoulder (44) at the rear face (16) of the tubular body (12).

* * * * *